Feb. 21, 1961 E. A. OHM 2,972,722

ELECTROMAGNETIC WAVE FILTER

Filed May 28, 1959 2 Sheets-Sheet 1

INVENTOR
E. A. OHM
BY Roy M. Porter, Jr.
ATTORNEY

Feb. 21, 1961 E. A. OHM 2,972,722

ELECTROMAGNETIC WAVE FILTER

Filed May 28, 1959 2 Sheets-Sheet 2

INVENTOR
E. A. OHM
BY Roy M. Porter, Jr.
ATTORNEY 2,972,722
Patented Feb. 21, 1961

2,972,722

ELECTROMAGNETIC WAVE FILTER

Edward A. Ohm, Shrewsbury, N.J., assignor to Bell Telephone Laboratories, Incorporated, New York, N.Y., a corporation of New York Filed May 28, 1959, Ser. No. 816,467
4 Claims. (Cl. 333—9)

Figures 1, 3:
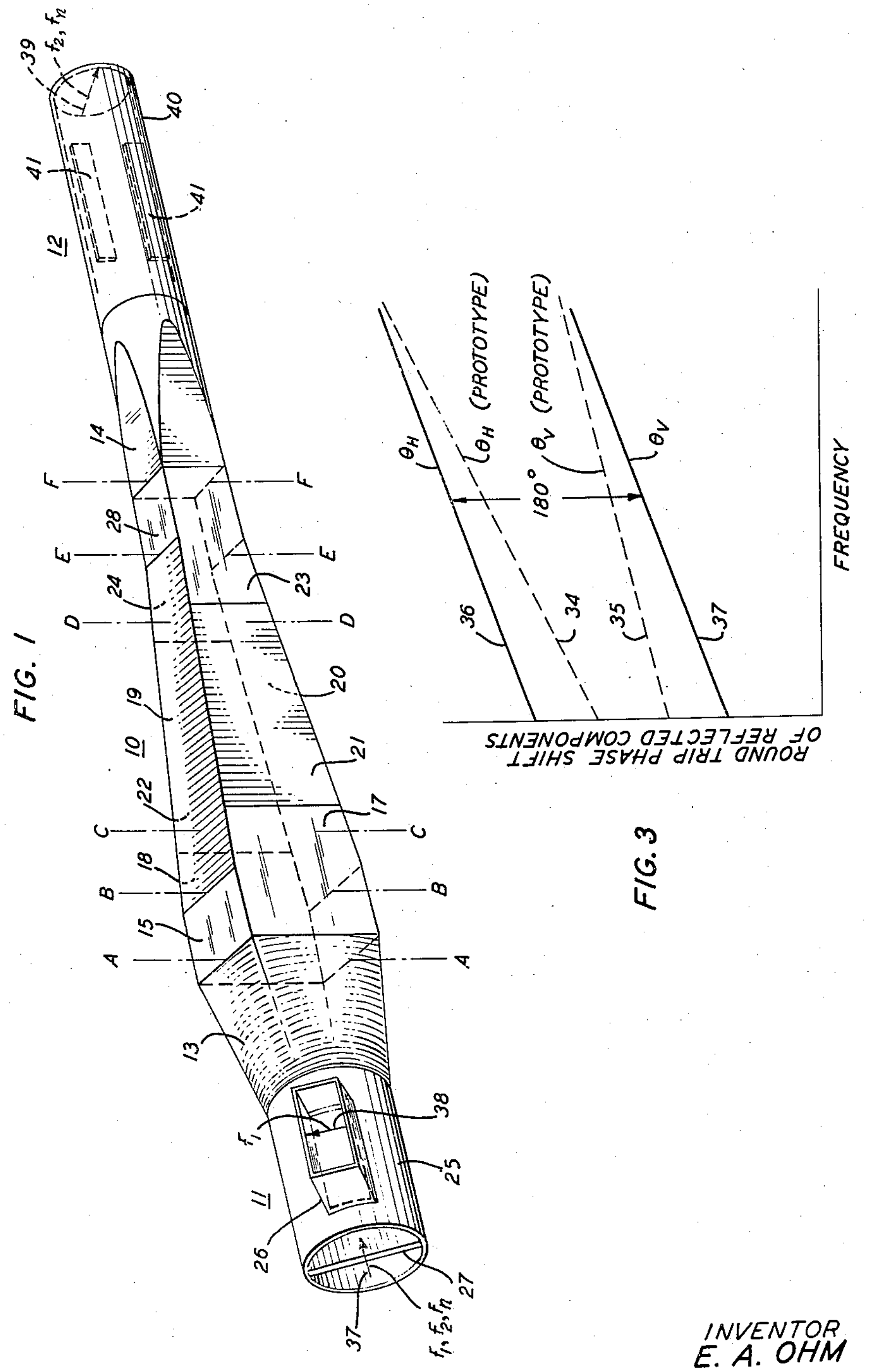

This invention relates to multichannel high frequency, microwave and millimeter wave communication systems and, more particularly, to an improvement upon the methods and means for segregating, branching or recombining the several channels or broadband signals making up the intelligence to be transmitted, received, amplified or otherwise utilized at terminal or repeater stations in a communication system as these methods and means are disclosed in my copending application Serial No. 724,684, filed March 28, 1958.

In said copending application, a filter is disclosed for separating channels having an arbitrary bandwidth and an arbitrary frequency separation between channels making a novel combined use of two well-known and unrelated phenomena, namely: the frequency selective reflection properties of a conductively bounded wave guide that is tapered in transverse dimension through cutoff at successive frequencies and the polarization rotating properties of a 180 degree differential phase shifter. Thus, linearly polarized multiband wave energy having equal horizontal and vertical components is applied to a differential phase-reflecting taper that reflects each frequency in one band in the vertical component 90 degrees sooner than it reflects that frequency in the horizontal component. The reflected components return with a 180 degree differential phase therebetween to combine to form a linearly polarized resultant polarized at 90 degrees to the applied wave and therefore capable of separation therefrom. Frequencies in other bands pass through the taper in the original polarization.

In the particular embodiment illustrated in my copending application the desired 180 degree difference between the vertical and horizontal components is obtained by longitudinally offsetting the horizontal taper one-quarter wave length from a similar vertical taper. However the offset inherently has the frequency sensitivity or frequency dispersion common to all conductively bounded wave guiding structures. This dispersion has the effect of limiting the bandwidth when extreme broad band operation is desired. In my copending application certain adjusting means are disclosed for deforming the tapers to compensate for the frequency dispersion to give a satisfactory broadband operation. These adjustments however were awkward and to a certain extent approximate.

It is therefore an object of the present invention to simplify and eliminate the adjustments required for separating channels of extremely broadbandwidth while maintaining a high degree of frequency discrimination between channels.

It is a corollary object to further increase the bandwidth of channels that may be separated without the adverse effects of frequency dispersion.

These objects are accomplished in accordance with the present invention by preceding the offset tapers by a dispersion compensating intermediate section of rectangular wave guide having both transverse dimensions thereof large enough to be above cutoff for the frequency bands of interest. The ratio between these transverse dimensions is however selected with respect to their cutoff frequencies so that the average cutoff frequency of the structure for the component polarization first reflected is greater than the average cutoff frequency of the structure for the component polarization last reflected to introduce a complementary dispersion characteristic that substantially cancels the inherent dispersion in the remainder of the branching circuit.

Figure 2:
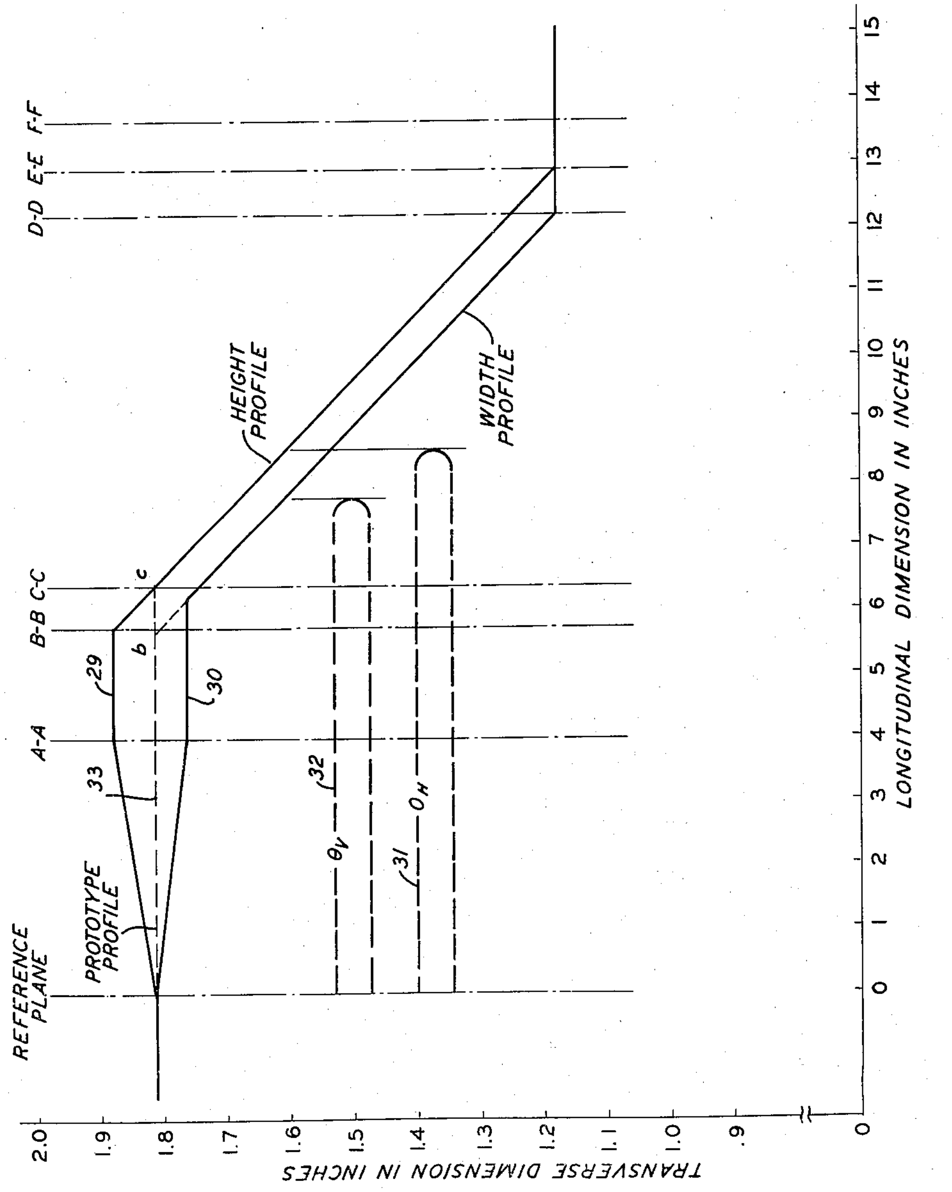

These and other objects and features, the nature of the present invention, and its various advantages will appear more fully upon consideration of the accompanying drawings and the following detailed description of these drawings:

Fig. 1 is a perspective view of a wave guide embodiment of the present invention;

Fig. 2, given for the purpose of explanation, shows the profiles of the height and width dimensions of the embodiment of Fig. 1 along with a prototype profile for comparison and also shows the round trip paths of reflected horizontally and vertically polarized components; and Fig. 3 shows the round trip phase shift versus frequency characteristic produced by the guide profiles of Fig. 2.

Referring more specifically to Fig. 1, a branching filter assembly in accordance with the invention is shown capable of separating or branching a channel or broadband signal centered about the frequency $f_1$ from other broadband signals centered about the successively higher frequencies $f_2$ and $f_n$. The bandwidth of each channel or the separation between channels or both may be any arbitrary number of frequencies. The several components comprising the branching filter include a differential phase-reflecting taper 10 adapted to pass both vertically and horizontally polarized components of the broadband signals $f_2$ and $f_n$ and to reflect successive frequencies of the broadband signal $f_1$ that are vertically polarized at points one-quarter wave length removed from the points of reflection of horizontally polarized components of corresponding frequency.

Taper 10 is fed by a transducer 11 by way of transition section 13 and phase dispersion compensating section 15 of specifically selected rectangular cross-section. Transducer 11 may be any of several microwave components adapted to apply linearly polarized wave energy through sections 13 and 15 to taper 10 in a polarization inclined at 45 degrees to the vertical and horizontal polarizations in taper 10 and to receive wave energy within the channel $f_1$ reflected from taper 10 in a polarization at right angles to the applied polarization. As illustrated in the drawing, transducer 11 includes a section of circular cross-section wave guide 25, a shunt connected rectangular side arm guide 26 and a septum 27. Taper 10 is followed by a further transition section 14 and a further phase corrector 12. The nature of each of these components and the function each performs will be considered separately hereinafter.

The heart of the present invention is the differential phase-reflecting taper 10 and its associated dispersion compensating section 15. Section 15 extends from section A—A to section B—B and comprises an elongated conductively bounded structure of uniform rectangular transverse cross-section having a width or horizontal dimension that is smaller than its height dimension but sufficiently large that the cutoff frequency for the vertical polarization therein is well below the lowest frequency in the lowest band $f_1$. Section 15 will therefore support either a vertical or horizontal polarization at all frequencies under consideration. The ratio between the width dimensions will be defined hereinafter.

Taper 10 commences in section B—B with top and bottom conductive boundaries comprising converging portions 19 and 20 that gradually reduce the vertical dimension of successive cross-sections from that at B—B to a square cross-section at E—E of dimensions small enough that its cutoff frequency is above the highest frequency in the lowest band $f_1$ and below all other frequencies in the bands $f_2$ and $f_n$. The side conductive boundaries comprise parallel portions 17 and 18 that continue as extensions of the sides of section 15 to section C—C and converging portions 21 and 22 that commence at cross-section C—C and with a rate of taper substantially equal to that of converging portions 19 and 20, reduce the horizontal dimension from that at cross-section C—C to a dimension at section D—D equal to that of cross-section E—E. Parallel portions 23 and 24 extend from the end of portions 21 and 23 in section D—D to cross-section E—E. A short section of guide 28 of uniform square cross-section continues from section E—E to section F—F to assure cutoff for the highest frequency in $f_1$.

The transition section 13 makes the connection between the circular cross-section at the end of guide 25 and the rectangular cross-section of compensator 15 at section A—A. In general it has a vertical or height dimension that increases gradually with length to the height dimension of section A—A and the width or horizontal dimension that decreases gradually in the same length to the width of section A—A. In particular transition 13 may be designed according to the teachings of my copending application Serial No. 816,098, filed May 27, 1959.

The resulting transverse dimension profile of the structure described in Fig. 1 is shown in Fig. 2. Thus, profile line 29 represents the variation of height with length and profile 30 represents the variation of width with length. The height increases, as shown by 29, from equal cross-section dimensions of guide 25 to section A—A, remains constant to section B—B, decreases through sections C—C and D—D to the output cross-section dimensions in section E—E. The width dimension, as shown by 30, decreases from a value equal to the height dimension at the end of guide 25 to section A—A, remains constant through section B—B to section C—C, decreases to section D—D and remains constant to section E—E.

The operation of the invention may best be understood by considering first, not the actual profile of the structure of Fig. 1, but instead, a simplified or prototype profile represented by the dotted characteristic 33 of Fig. 2. Profile 33 neglects the taper of transition 13 and neglects the differing transverse dimensions of compensating section 15 by assuming that the input cross-section is uniformly square and equal to the width profile at point *b* and the height profile at point *c*. Profile 33 is very similar to the profile of the embodiment shown in my above-mentioned copending application Serial Number 724,684 over which the present embodiment represents an improvement.

Profile 33 defines a structure that tapers to cutoff for a given frequency in a horizontal polarization at one cross-section along its length and tapers to cutoff at that frequency in a vertical polarization at a second cross-section displaced from the first cross-section by the amount of the taper offset between points *b* and *c*. Since wave energy applied will propagate into the taper until it reaches a cutoff cross-section and then be reflected, the round trip or reflected phase shift of a horizontally polarized component will be greater than that of a vertically polarized component by an amount equal to twice the wave length distance of the taper offset. This is illustrated in Figs. 2 and 3. The characteristic 31 of Fig. 2 represents the round trip path $\theta_H$ of a horizontally polarized component and characteristic 34 of Fig. 3 represents the round trip phase versus frequency characteristic of $\theta_H$ for the prototype profile 33. The characteristic 32 of Fig. 2 represents the round trip path $\theta_V$ of a vertically polarized component and the characteristic 35 represents its phase versus frequency characteristic. At any given frequency the phase difference between $\theta_H$ and $\theta_V$ can be made equal to any given value by selecting the offset phase distance to equal one-half of that given value. In the embodiment of my copending application this distance is one-quarter wave length to produce a 180 degree phase difference at the given frequency. This difference is however not automatically constant over a broad band since it will be recalled that any wave guide, such as the section between B—B and C—C, has a certain frequency dispersion with the result that the higher frequencies which are further from the guide cutoff travel faster than the lower frequencies that are closer to cutoff. This explains the positive slopes with frequency of characteristics 34 and 35 of Fig. 3. Since the phase difference between $\theta_V$ and $\theta_H$ is a result of the longer travel of $\theta_H$ as compared with $\theta_V$, $\theta_H$ has been subjected to more frequency dispersion than $\theta_V$. This is shown by the steeper slope of characteristic 34 as compared with the lesser slope of characteristic 35. The result is that while in a structure having the prototype profile 33 the phase difference between the vertical and horizontal components may be predetermined at a given frequency, the phase difference at higher frequencies will be greater and at lower frequencies would be less.

In accordance with the present invention this frequency dispersion is equalized by inserting dispersion compensating section 15 and its associated tapered transition section 13 to produce profiles 29 and 30 described above. Comparing the height profile 29 that determines the phase of the horizontally polarized components with the prototype profile 33, it will be seen that this polarization is exposed in section 15 and transition 13 to a larger average dimension than in the prototype. The concept of "average" dimension is used here to account for the increased height resulting from the taper of 13 as well as the increased height of section 15. Since this larger average height dimension lowers the average cutoff frequency of the structure for the horizontal polarization as compared with the prototype, it produces a larger phase shift with less phase dispersion. This is represented by characteristic 36 of Fig. 3 that extends through larger values of phase shift but with less increase with frequency than characteristic 34. Similarly, profile 30, which determines the phase of the vertically polarized component, is of smaller average dimension and higher average cutoff frequency than prototype profile 33 because of the decreased horizontal dimension of section 13 and section 15. Being nearer to cutoff than the prototype, profile 30 introduces a smaller phase shift with more frequency dispersion as represented by characteristic 37 of Fig. 3 that extends through lower phase shift values with more increase with frequency than characteristic 35. By properly choosing the relative cross-sectional dimensions of section 15 relative to its length and the taper offset distance between sections B—B and C—C, the phase difference between $\theta_H$ and $\theta_V$ may be made equal to the desired 180 degrees. Furthermore, if this selection is made with due regard to the length and degree of taper of transition section 13 and the length and degree of taper of section 10, characteristics 36 and 37 may be made straight lines that are parallel to each other over an extermely broad frequency band with the result that the desired 180 degree phase difference is maintained between $\theta_H$ and $\theta_V$ for every frequency within that broad band. It is not believed necessary for the present disclosure to set forth the design procedure to be used in optimizing these relative parameters. Such a procedure employs wave guide equations and design approaches that are standard in this art. The optimum parameters may also be derived empirically. The profiles of Fig. 2 have been more or less drawn to scale and the ordinate and abscissa values thereof are those of a typical embodiment.

Having thus analyzed the nature of taper section 10 and its phase dispersion compensating section 15, the overall operation of the invention may be described. The broadband signals $f_1$, $f_2$ and $f_n$ to be separated are applied to guide 25 in the linear polarization represented by vector 37 on Fig. 1. This polarization is substantially unaffected by septum 27 and arm 26 and enters section 15 at cross-section A—A with equal vertical and horizontal components therein. Components in the bands $f_2$ and $f_n$ pass on to cross-section E—E. Components in the $f_1$ band are reflected with a 180 degree relative phase delay $\theta_H - \theta_V$ introduced to the horizontal component as a result of its additional travel down taper 10. The vector sum of the vertical and horizontal components produces a polarization rotation of their resultant of 90 degrees bringing this resultant into the polarization represented by vector 38 on Fig. 1. This polarization is reflected by septum 27 and accepted by guide 26 so that the components in the broadband centered upon the frequency $f_1$ are separated from the bands $f_2$ and $f_n$.

The frequency components in the bands centered upon $f_2$ and $f_n$ emerge at cross-section E—E or F—F as elliptically polarized waves with the vertical component thereof advanced in phase with respect to the horizontal component. This is because the total phase of the vertical component includes the sum of the phase shifts introduced along the taper from section C—C to D—D and along the section of narrower magnetic plane dimension from A—A to C—C as well as from D—D to E—E. On the other hand, the total phase of the horizontal component includes the sum of phase shifts introduced along the taper from section B—B to E—E and along the section of wider magnetic plane dimension from A—A to B—B. Since the phase constants along the taper portions are equal for both polarizations, the net phase difference is a result of the higher cutoff and faster phase velocity in sections A—A to C—C and D—D to E—E to which the vertical polarization is exposed as compared with the lower cutoff and slower phase velocity in section A—A to B—B to which the horizontal polarization is exposed. Thus equalizer 12 is provided to introduce an equal and compensating phase delay to the vertical component. More specifically, equalizer 12, which is coupled by transition section 14 to square guide 28 at section F—F, comprises a section of circular guide 40 having such a diameter that its cutoff frequency is equal to that between sections D—D and E—E for the vertically polarized wave. Guide 40 is capacitively loaded by two oppositely positioned metallic fins 41 extending in the electric plane of the vertically polarized wave therein by an amount that raises the cutoff frequency for the vertically polarized component to equal that of the cutoff frequency of the horizontally polarized component between sections A—A and B—B. Fins 41 extend longitudinally for a distance equal to the distance between A—A and B—B. Since the phase constant of an unloaded rectangular wave guide and a wave guide loaded with fins of the type described are identical functions of operating frequency and cutoff frequency, the phase constants will be identical for all frequencies when the cutoff frequencies are equal. Thus, the vertical component of every frequency in the broadband channels centered about both $f_2$ and $f_n$ is delayed by fin 41 by an amount equal to the delay introduced to the horizontal component at that frequency between sections A—A and B—B (equal phase constants over equal distances). Similarly, every frequency of the horizontal component (which is unaffected by fins 41) is exposed to a phase constant in guide 15 equal to the phase constant to which the vertical component was exposed in sections C—C and D—D. The vertical and horizontal components are thereby brought into phase to result in a linearly polarized wave as represented by vector 39. This energy may be applied to a similar branching filter for separating the next band $f_2$ from further bands of higher frequency. Any number of branching filters of the type shown may thus be cascaded, each successive filter being scaled in accordance with the principles described to reflect and separate successively higher frequencies.

Obviously, the sharply discontinuous edges of fins 41 will produce undesired reflections in a refined application of the invention and a more refined embodiment thereof is disclosed in my copending application.

It should be noted that all components making up the invention are reciprocal and it may be used as well to combine channels. Thus successively lower channels are added to the higher frequency channels already combined.

It should also be noted that the disclosed tapered cutoff characteristic is an electrical property and does not necessarily require that the physical conductive boundary of the guide be itself tapered. For example, the guide itself could be of uniform cross-section and electrically tapered by having screws on its side walls that penetrate progressively less into the guide along its length. A similar effect could be obtained by the appropriate use of tapered elements of dielectric material or tapered vanes of conductive material in a wave guide of constant cross-section.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. Filter means for separating a broadband of frequencies of electromagnetic wave energy from other frequencies comprising input means for supporting said energy in a given polarization, an elongated conductively bounded structure connected to said input for reflecting at each frequency in said band first and second equal orthogonal components of said polarization from first and second points respectively spaced from each other along the length of said structure, said structure having an average cutoff frequency that is lower for the component reflected from said first point than for the component reflected from said second point, a first output means connected to said structure and adatped to support energy polarized at right angles to said given polarization for receiving said reflected energy within said band, and a second output means connected to said structure for receiving nonreflected energy at said other frequencies.

2. An elongated electromagnetic wave guiding enclosure having a conductive boundary that tapers along its length in two orthogonal dimensions of its transverse cross-section, said tapers of said two dimensions being opposite in direction and coextensive longitudinally along one portion of said length and being the same in direction and offset longitudinally from each other along another portion of said length, means for applying electromagnetic wave energy to said enclosure polarized at an acute angle to said dimensions, and means for coupling to energy within said enclosure polarized at right angles to said last named polarization.

3. Filter means for separating a broad band of frequencies of electromagnetic wave energy from other frequencies comprising a conductively bounded structure adapted to support said wave energy in orthogonal polarizations, said structure having a region in which the average cutoff frequency is lower for energy in one of said polarizations than in the other of said polarizations, said structure being cut off at one point along its length for said one polarization at the lowest frequency in said band and being cut off for said one polarization at successive points along its length for successively higher frequencies in said band, said structure being cut off at points longitudinally removed for the other of said polarizations from respective points of cutoff at each frequency for said one polarization, and means for coupling to and from said structure in two respective polarizations at 90 degrees to each other and at 45 degrees to said orthogonal polarizations.

4. An elongated conductively bounded electromagnetic wave guiding enclosure having equal transverse dimensions at one point along its length in first and second orthogonal axial planes thereof, said structure having different transverse dimensions at a second point along its length with the dimension at said second point in said first plane being larger and in said second plane being smaller than the dimensions at said first point, said structure at a third point along its length having the dimension in said first plane smaller than and in said second plane equal to the parallel dimensions at said second point, said structure at a fourth point along its length having the dimensions in both planes smaller than the parallel dimensions at said third point.

References Cited in the file of this patent

UNITED STATES PATENTS 2,810,890 Klopfenstein ____________ Oct. 22, 1957